United States Patent [19]

Headley

[11] Patent Number: 5,642,903
[45] Date of Patent: Jul. 1, 1997

[54] CONSUMABLE CLOSURE SUPPORT FOR AIR BAG INFLATOR

[75] Inventor: Paul S. Headley, Mesa, Ariz.

[73] Assignee: TRW Inc., Lyndhurst, Ohio

[21] Appl. No.: 529,271

[22] Filed: Sep. 15, 1995

[51] Int. Cl.$^6$ .................................................. B60R 21/26
[52] U.S. Cl. .................... 280/737; 137/68.13; 137/68.22; 222/3
[58] Field of Search ........................... 280/737, 736, 280/740, 741, 742; 137/68.22, 68.23, 68.25, 68.28, 68.19, 68.13, 69; 222/3, 541.3, 541.4

[56] References Cited

U.S. PATENT DOCUMENTS

| | | | |
|---|---|---|---|
| 2,736,459 | 2/1956 | Cockram et al. | 137/68.13 |
| 3,670,925 | 6/1972 | Moyant | 137/68.19 |
| 3,731,948 | 5/1973 | Risko | 280/737 |
| 3,743,318 | 7/1973 | Yamaguchi et al. | 280/737 |
| 3,777,772 | 12/1973 | Arnold et al. | 280/737 |
| 3,900,211 | 8/1975 | Russell et al. | 280/737 |
| 3,966,228 | 6/1976 | Neuman | 280/737 |
| 4,006,919 | 2/1977 | Neuman | 280/736 |
| 4,077,423 | 3/1978 | Kasagi et al. | 137/68.13 |
| 4,195,745 | 4/1980 | Roberts et al. | 137/68.22 |
| 4,289,327 | 9/1981 | Okada | 280/737 |
| 5,152,550 | 10/1992 | Hoagland et al. | 280/737 |
| 5,226,669 | 7/1993 | Honda | 280/737 |
| 5,263,740 | 11/1993 | Frey et al. | 280/737 |
| 5,362,099 | 11/1994 | Föhl | 280/737 |
| 5,468,015 | 11/1995 | Goetz | 280/737 |

*Primary Examiner*—Brian L. Johnson
*Assistant Examiner*—Peter C. English
*Attorney, Agent, or Firm*—Tarolli, Sundheim, Covell, Tummino & Szabo

[57] ABSTRACT

An apparatus for inflating an air bag (22) comprises a container (40) which holds an inflation fluid under pressure. The container (40) has an opening (44) through which the inflation fluid flows to inflate the air bag (22). A rupturable closure (80) is fixed to the container (40) and extends across the opening (44) to block the flow of inflation fluid through the opening when the closure is reinforced. The closure (80), when unreinforced, ruptures in response to pressure of the inflation fluid acting on the closure. A combustible member (100) is supported by the container (40) to reinforce the closure (80) and resist rupturing of the closure. The closure (80) becomes unreinforced upon a predetermined amount of combustion of the member (100). An actuatable initiator (120), upon actuation, initiates combustion of the member (100).

15 Claims, 3 Drawing Sheets

CONSUMABLE CLOSURE SUPPORT FOR AIR BAG INFLATOR

BACKGROUND OF THE INVENTION

1. Technical Field

The present invention relates to an inflatable vehicle occupant restraint, and particularly to an inflator which provides inflation fluid for inflating the inflatable restraint.

2. Description of the Prior Art

Inflators which provide inflation fluid for inflating inflatable vehicle occupant restraints, such as air bags, are known. One type of inflator includes a container for storing an inflation fluid under pressure. The container has an opening through which the inflation fluid can flow to inflate an air bag. A rupturable closure extends across the opening to block fluid flow through the opening when the closure is unruptured.

The closure may be ruptured in a number of ways. One way of rupturing the closure is to increase the pressure of the inflation fluid stored in the container to a predetermined pressure that applies a force to the closure which exceeds the strength of the closure. Thus, the closure ruptures.

In some inflators, closures are used which do not possess the strength to resist rupturing under the force of the pressure of the inflation fluid stored in the chamber. These closures are provided with a support structure which is made from a breakable material, such as glass. The support structure supports the closure from rupturing due to the pressure of the inflation fluid. The support structure breaks in response to a situation requiring inflation of the air bag. Upon breaking, the support structure no longer supports the closure. Thus, the pressure of the stored inflation fluid acting on the closure ruptures the unsupported closure to permit inflation fluid to flow through the opening to inflate the air bag.

SUMMARY OF THE INVENTION

The present invention is directed to an apparatus for inflating an inflatable vehicle occupant restraint, such as an air bag. The apparatus comprises a container for holding inflation fluid under pressure. The container has an opening through which the inflation fluid can flow to inflate the air bag. A closure extends across the opening. A member made of a consumable material supports the closure in a position to block the flow of inflation fluid through the opening. The member becomes ineffective to support the closure in the position blocking the flow of inflation fluid through the opening after a predetermined amount of the member is consumed. Actuatable means is provided to initiate, upon actuation, consumption of the member.

The container and the closure cooperate to define a chamber to store the inflation fluid. The member of consumable material is located outside of the chamber. The closure is secured to the container by a weld located around the opening. The closure ruptures in response to the pressure of the inflation fluid acting on the closure when the closure is unsupported by the member.

The member made of the consumable material is preferably located in a retention chamber in the container and engages the closure. The retention chamber is located adjacent the opening. The retention chamber is frustoconical in shape. The member is molded or cast-in-place in the retention chamber. The consumable material of the member is combustible.

BRIEF DESCRIPTION OF THE DRAWINGS

Further features and advantages of the present invention will become apparent to those skilled in the art to which the present invention relates from reading the following specification with reference to the accompanying drawings, in which.

DESCRIPTION OF A PREFERRED EMBODIMENT

Figure 1:
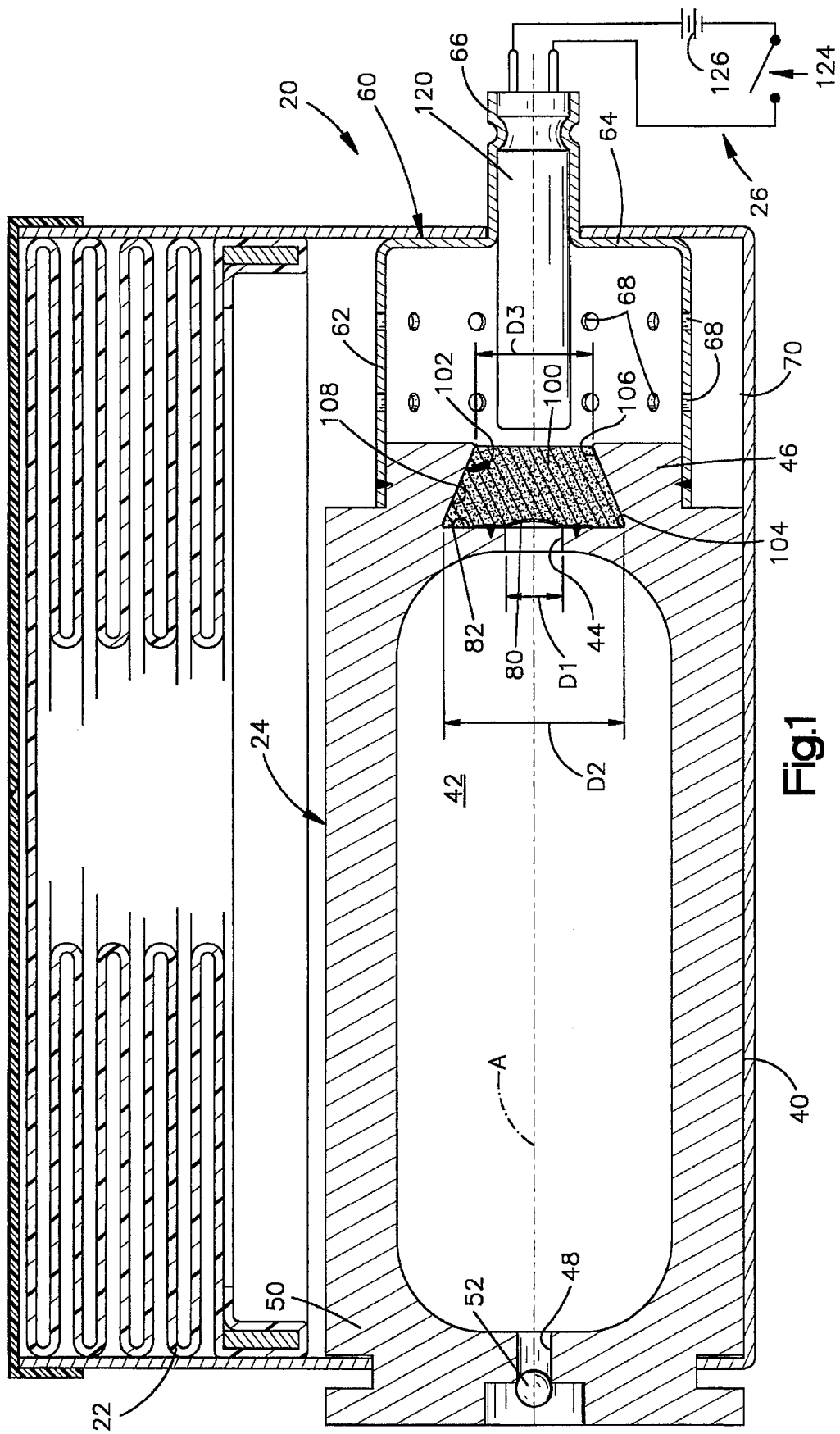
FIG. 1 is a schematic sectional view of an air bag inflator embodying the present invention.

An inflatable vehicle occupant restraint system 20 is illustrated in FIG. 1. The restraint system 20 includes an air bag 22 that is inflatable in response to a condition of the vehicle being sensed which requires inflation of the air bag. The restraint system 20 also includes an actuatable inflator 24 which provides inflation fluid to inflate the air bag 22. The restraint system 20 further includes an electric circuit 26 which is operably connected with the inflator 24 and which actuates the inflator to inflate the air bag 22.

The inflator 24 includes a cylindrical container 40 that has a longitudinal central axis A. The container 40 is preferably made in one piece from a metal, such as steel or aluminum. The container 40 could also be made from a fiber reinforced plastic material.

The container 40 partially defines a chamber 42 for holding and storing a non-ignitable inflation fluid under pressure or an ignitable gas mixture. The chamber 42 preferably stores an inflation fluid which is an inert gas, such as argon or nitrogen or a mixture of inert gases. The inflation fluid is stored at a pressure of at least 2,000 psi and is preferably stored at a pressure in a range of about 3,500 psi to 4,500 psi.

An opening 44 extends through a right end portion 46 of the container 40, as viewed in FIG. 1. The opening 44 is preferably circular with a diameter D1, measured normal to the axis A. The center of the opening 44 is located on the axis A of the container 40. The opening 44 fluidly communicates the chamber 42 with the air bag 22. The inflation fluid flows from the chamber 42 through the opening 44 to inflate the air bag 22. A gas fill port 48 is located in a left end portion 50 of the container 40, as viewed in FIG. 1, and is sealed by a spherical member 52.

A diffuser 60 is fixed to the right end portion 46 of the container 40. The diffuser 60 is made from a metal, such as steel or aluminum, and includes a cylindrical main portion 62, an end wall 64 and a tubular mounting 66. The cylindrical main portion 62 of the diffuser 60 is welded to the right end portion 46 of the container 40 and surrounds the opening 44. The cylindrical main portion 62 of the diffuser 60 may alternately have a portion that is deformed or crimped into a groove (not shown) in the container 40 to fix the diffuser to the container. The end wall 64 extends radially inward from the opposite end of the cylindrical main portion 62. The tubular mounting 66 extends axially from the end wall 64 and is located around the axis A.

The cylindrical main portion 62 of the diffuser 60 includes a plurality of openings 68 which direct the flow of inflation fluid radially outward relative to the axis A. A deflector or reaction canister 70 is fixed to the container 40 of the inflator 24. The reaction canister 70 deflects the inflation fluid which exits the lower portion of the diffuser 60, as viewed in FIG. 1, toward the air bag 22. The inflation fluid which exits the upper portion of the diffuser 60, as viewed in FIG. 1, is directed into the air bag 22 without being deflected by the reaction canister 70.

A rupturable closure 80 extends across the opening 44 and is attached to a radially extending surface 82 of the container 40 by a weld 84. Preferably the weld 84 is a laser weld. The closure 80 has a pair of major side surfaces 85 (FIG. 2) facing in opposite directions. The closure 80 is made from a relatively thin metal material that is compatible for welding to the container 40, such as steel for a steel container or aluminum for an aluminum container, and is fluid impermeable. The weld 84 extends continuously around a peripheral edge 86 of the closure 80 to fix the closure to the end surface 82 of the container 40 and to provide a fluid tight seal of the opening 44 in the container. The container 40, the closure 80 and the weld 84 thus cooperate to define and seal the chamber 42. The closure 80 may contain a coined weakened area which ruptures relatively easy and in a predetermined manner when it is unsupported.

A member 100 (FIGS. 1 and 2) is located in a retention chamber 102 formed in the right end portion 46 of the container 40 along the axis A. The member 100 supports and reinforces the closure 80. The member 100 is preferably made from a consumable material that is moldable or castable. The member 100 is preferably made from a pyrotechnic material that is combustible. The pyrotechnic material burns relatively fast. The pyrotechnic material of the member 100 may be any suitable material, but is preferably a mixture of polyvinyl chloride and potassium perchlorate. The polyvinyl chloride acts as a binder which suspends the potassium perchlorate prior to ignition and acts as a fuel after the member 100 is ignited. The potassium perchlorate acts as an oxidizer during combustion.

The retention chamber 102 is frustoconical in shape and is located adjacent the opening 44. The retention chamber 102 is formed in the container 40 by a swaging operation. The surfaces of the right end portion 46 of the container 40 which define the retention chamber 102 include a side surface 108 that extends in generally the same direction as, but is angled relative to, the axis A. The angled side surface 108 defines a base 104 and a top portion 106 for the chamber 102. The base 104 of the retention chamber 102 is located adjacent to the end surface 82 of the container 40. The base 104 of the retention chamber 102 has a diameter D2, measured normal to the axis A. The top portion 106 of the chamber 102 is located to the right of the base 104, as viewed in FIG. 2. The top portion 106 has a diameter D3 which is smaller than the diameter D2 of the base 104 and is greater than the diameter D1 of the opening 44. The retention chamber 102 fluidly communicates with the opening 44 when the closure 80 is ruptured.

The member 100 is molded or cast in place in the retention chamber 102 from a liquified mixture of a pyrotechnic material. The liquified pyrotechnic material is introduced into the retention chamber 102 to engage the closure 80 and completely fill the retention chamber. The liquified pyrotechnic material is preferably introduced into the retention chamber 102 after the closure is fixed to the end surface 82 of the container 40 by the weld 84 but prior to filling the chamber 42 with inflation fluid. The liquified pyrotechnic material of the member 100 solidifies in the retention chamber 102 and remains in engagement with the closure 80.

An angled outer side surface 110 of the member 100 lies against the angled side surface 108 of the retention chamber 102. The angled side surface 108 thus prevents the member 100 from moving in a direction to the right, as viewed in FIG. 2, away from supporting or reinforcing engagement with the closure 80. The member 100 thus supports and reinforces the closure 80 against the pressure of the inflation fluid in the chamber 42 when the chamber 42 is filled with inflation fluid.

The combined strength of the member 100 and the closure 80 resists rupturing of the closure due to the pressure of the inflation fluid in the chamber 42 acting on the closure. The pressure in the chamber 42 under normal operating conditions is preferably no greater than 5,000 psi. When the closure 80 is unsupported, minimally supported, unreinforced or minimally reinforced, the closure preferably ruptures at a pressure of the inflation fluid in the chamber 42 of no more than 1,000 psi.

The member 100 is consumed during combustion. When a predetermined amount of the member 100 is consumed, the closure 80 is no longer sufficiently supported or sufficiently reinforced. During combustion of the member 100, the closure 80 heats which weakens the closure. The closure 80 is thus unsupported, minimally supported, unreinforced or minimally reinforced, and the member 100 no longer adds enough strength to the closure to resist rupturing. The closure 80 then ruptures under the pressure of the inflation fluid in the chamber 42 acting on the closure. The inflation fluid flows from the chamber 42 through the opening 44 to inflate the air bag 22.

An initiator 120 is supported by the tubular mounting 66 of the diffuser 60. The initiator 120 is actuatable to ignite the member 100 for initiating combustion and consumption of the support member. The initiator 120 is located along the axis A at the right end of the inflator 24, as viewed in FIG. 2. An end surface 122 of the initiator 120 is located adjacent to and spaced from a right end 130 of the member 100, as viewed in FIG. 2. The initiator 120 includes an igniter and a quantity of ignitable booster material.

The initiator 120 is electrically connected with the electric circuit 26. The electric circuit 26 communicates electrical power to the initiator 120 to actuate the initiator. A sensor 124, such as a deceleration sensor, in the electric circuit 26 senses a deceleration of the vehicle above a predetermined deceleration magnitude at which inflation of the air bag 22 is desired. The sensor 124 closes, in response to sensing the predetermined deceleration, to connect electrical power from a power supply 126 in the electric circuit 26 to the initiator 120 and actuate the igniter.

Figure 2:
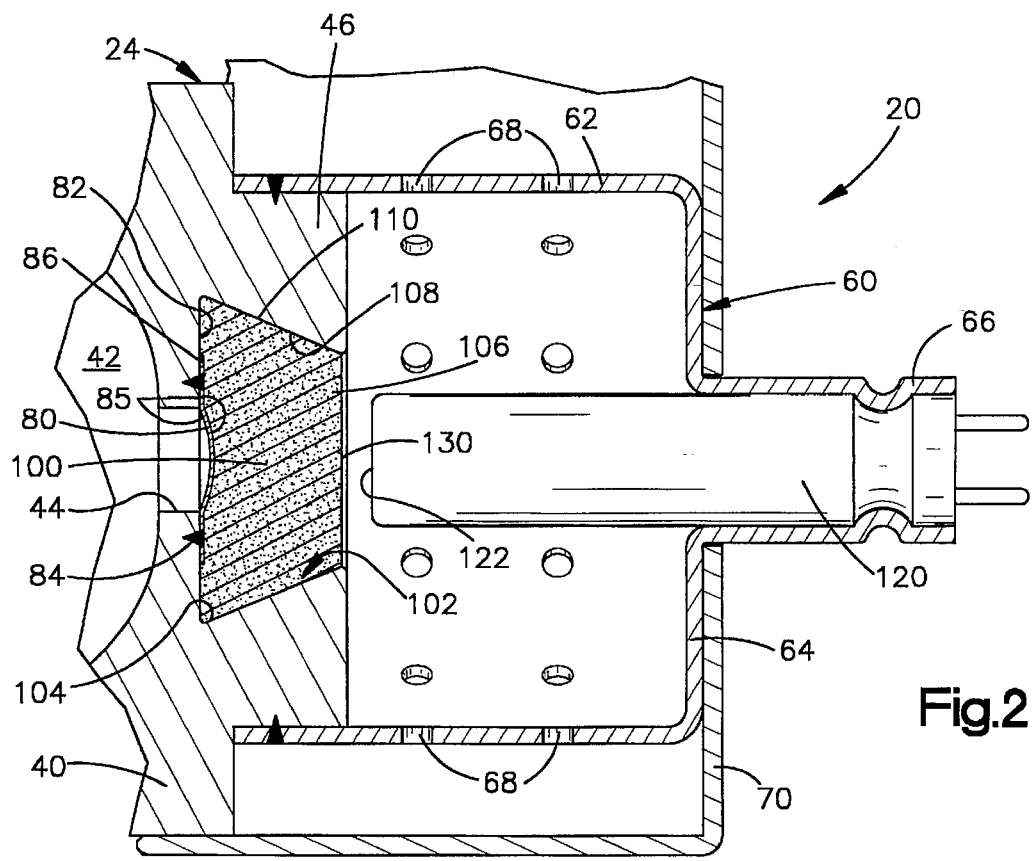
FIG. 2 is an enlarged view of an end portion of the inflator of FIG. 1.

In operation, the closure 80 initially blocks the flow of inflation fluid from the chamber 42 through the opening 44 when the closure is supported or reinforced, as illustrated in FIGS. 1 and 2. The closure 80, when unsupported or unreinforced, does not have enough strength to resist rupturing. The closure 80 ruptures in response to a force being applied to the unsupported or unreinforced closure by the pressure of the inflation fluid in the chamber 42 acting on the closure.

Specifically, the closure 80 ruptures when the force of the pressure of the inflation fluid stored in the chamber 42 acting on the closure overcomes the combined resistance to rupturing of the closure and its support or reinforcement. The force acting on the closure 80 due to the pressure of the inflation fluid in the chamber 42, exceeds the strength of an unsupported, minimally supported, unreinforced or minimally reinforced closure to rupture the closure.

Figure 3:
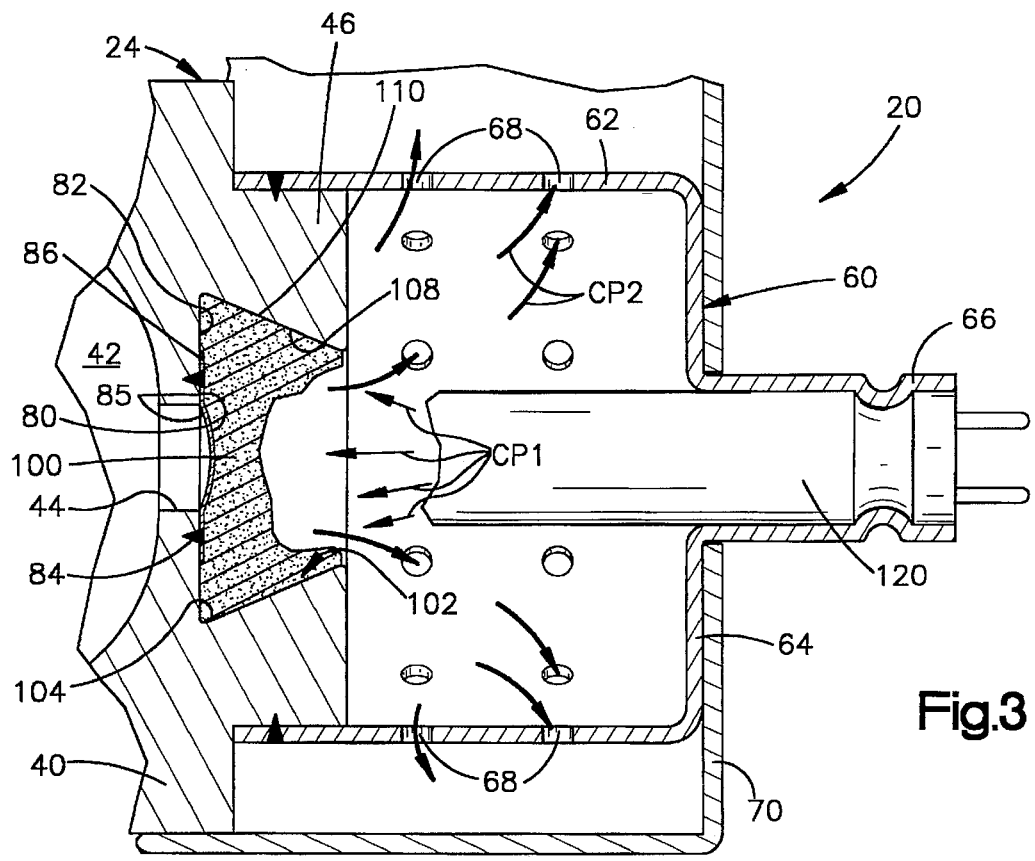
FIGS. 3–5 are views similar to FIG. 2 with parts illustrated in different conditions.

Upon actuation of the igniter in the initiator 120, the booster material ignites to produce initiating combustion products CP1, including heat, pressure and hot particles, as illustrated in FIG. 3. The initiating combustion products CP1 are released from the end 122 of the initiator 120. The initiating combustion products CP1 are directed at the right end 130 of the member 100 to contact and ignite the pyrotechnic material of the support member. The member 100 ignites and generates combustion products CP2 which exit the openings 68 in the diffuser 60 to start filling the air bag 22.

Figure 4:
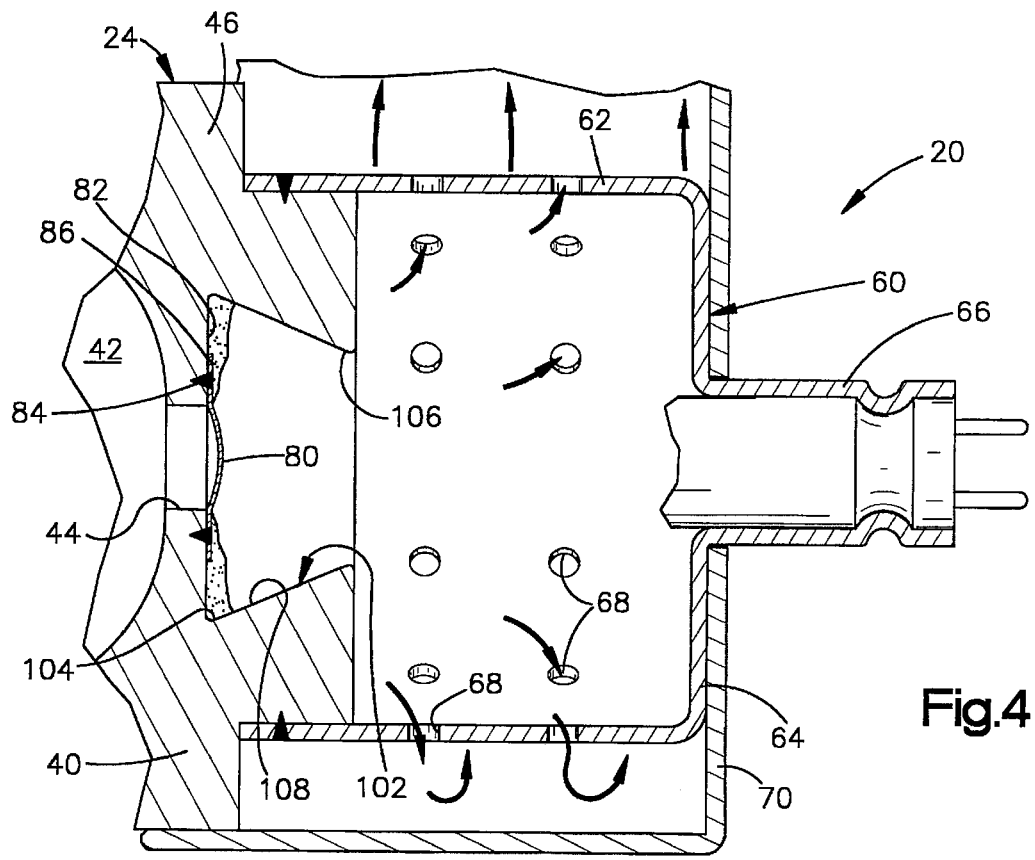
Figure 5:
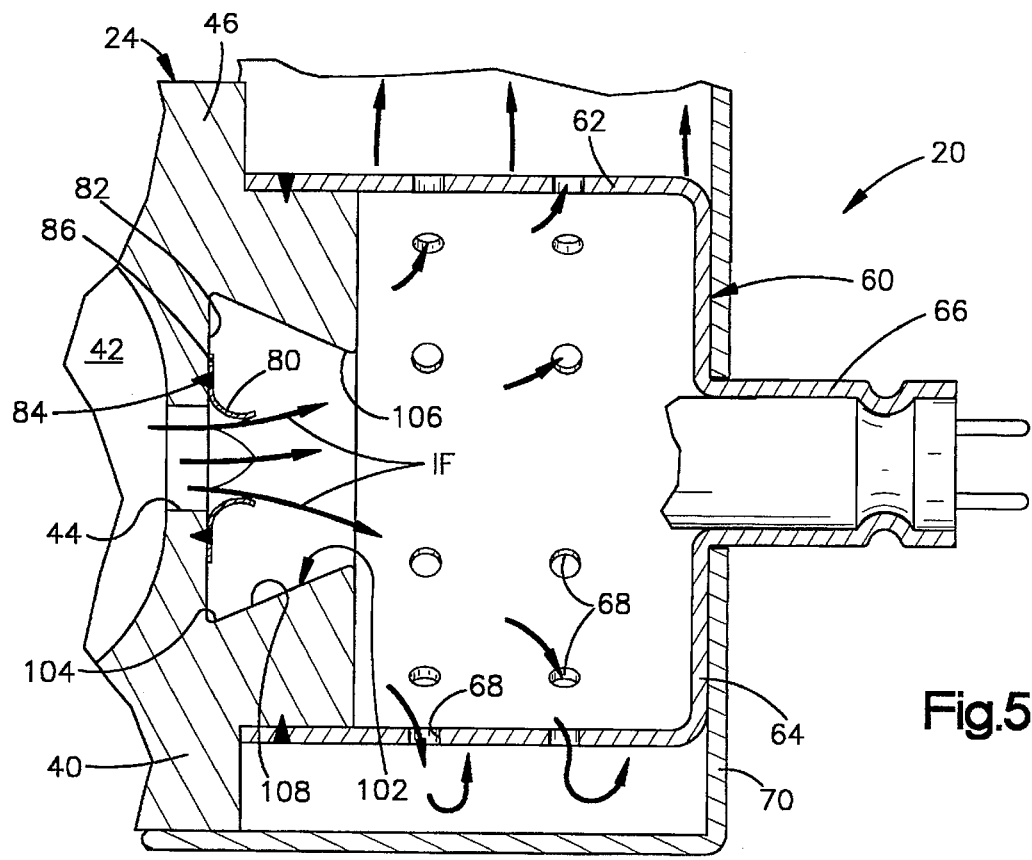

As illustrated in FIG. 4, the member 100 continues to burn, and the predetermined amount of the member is consumed so the remainder of the support member no longer sufficiently supports or reinforces the closure 80. The time duration at which the predetermined amount of the member 100 is consumed is approximately 2 milliseconds. Pressure of the inflation fluid within the chamber 42 acts on the now insufficiently supported or insufficiently reinforced closure 80, and the closure ruptures, as illustrated in FIG. 5. The inflation fluid IF flows through the opening 44 in the container 40 from the chamber 42 and into the diffuser 60 to inflate the air bag 22.

From the above description of the invention, those skilled in the art will perceive improvements, changes and modifications. For example, it will be apparent that the closure 80 may be movable and not rupturable. The closure 80 would not be welded to the surface 82 of the container 40 but be held against the surface by the member 100. The closure 80 would block the flow of inflation fluid through the opening when supported and held in place by the member 100. The closure 80 would move, when unsupported by the member 100, to a position that is ineffective to block the flow of inflation fluid through the opening 44. The closure 80 could also melt or burn by combustion of the member 100. It will also be apparent that the closure 80 could be eliminated and the member 100 be made from a fluid impermeable material to block the opening 44. It will be apparent that the member 100 does not have to completely fill the retention chamber 102, as illustrated in FIGS. 1–2, or does not have to engage the closure 80 over an entire major side surface 85, to support or reinforce the closure sufficiently.

Further, although the preferred embodiment of the invention describes the inflation fluid as being stored under pressure from the time the container 40 is filled, the inflation fluid could be stored at atmospheric pressure or at a pressure below the pressure at which the unsupported closure 80 ruptures. At the time inflation of the air bag 22 is desired, the pressure of the inflation fluid could be increased by heating the inflation fluid. The heat could be provided by an ignitable material, such as an ignitable gas, in the container 40. The pressure of the inflation fluid could then be allowed to increase until it exceeds the pressure at which the unsupported closure 80 ruptures before the initiator 120 is actuated. The container 40 would thus just hold the inflation fluid under pressure for a relatively short time. Such improvements, changes and modifications within the skill of the art are intended to be covered by the appended claims.

Having described the invention, the following is claimed:

1. An apparatus for inflating an inflatable vehicle occupant restraint, said apparatus comprising:

a container for holding a fluid under pressure, said container having an opening through which the fluid flows to inflate the restraint;

a closure extending across and adjacent the opening, the pressure of the fluid acting on said closure;

a member made of a consumable material supporting said closure in position to block fluid flow through the opening, said member becoming ineffective to support said closure in position to block fluid flow through the opening after a predetermined amount of said member is consumed, said closure being ineffective to block fluid flow through the opening when said member is ineffective to support said closure; and actuatable means for, upon actuation, initiating consumption of said member.

2. The apparatus of claim 1 further including a seal between said closure and said container, said seal surrounding the opening.

3. The apparatus of claim 2 wherein said seal comprises a weld fixing said closure to said container.

4. The apparatus of claim 3 wherein said closure is rupturable, said closure rupturing in response to pressure of the fluid in said container acting on said closure when said member is ineffective to support said closure in position to block fluid flow through the opening.

5. The apparatus of claim 4 wherein said member engages said closure to support said closure and resist rupturing of said closure prior to the predetermined amount of said member being consumed.

6. The apparatus of claim 1 wherein said member engages said closure to support said closure prior to the predetermined amount of said member being consumed.

7. The apparatus of claim 1 wherein said container and said closure cooperate to define a chamber for holding the fluid, said member being located outside of the chamber.

8. The apparatus of claim 1 wherein said member is a structure located in a retention chamber in said container.

9. The apparatus of claim 8 wherein the retention chamber in said container is located adjacent the opening in said container and is frustoconical in shape.

10. The apparatus of claim 8 wherein said member is made of a combustible pyrotechnic material, and said initiating means, upon actuation, ignites said member.

11. An apparatus for inflating an inflatable vehicle occupant restraint, said apparatus comprising:

a container for holding an inflation fluid under pressure, said container having an opening through which the inflation fluid flows to inflate the restraint;

a rupturable closure fixed to said container and extending across and adjacent the opening to block the flow of inflation fluid through the opening when said closure is reinforced, the pressure of the inflation fluid acting on said closure, said closure rupturing in response to pressure of the inflation fluid acting on said closure when said closure is unreinforced;

a combustible member supported by said container and reinforcing said closure to resist rupturing of said closure, said closure being unreinforced upon combustion of a predetermined amount of said member, said closure rupturing upon combustion of the predetermined amount of said member; and actuatable means for, upon actuation, initiating combustion of said member.

12. The apparatus of claim 11 wherein said member engages said closure to reinforce said closure.

13. The apparatus of claim 11 wherein said container and said closure cooperate to define a fluid-tight chamber for holding the fluid, said member being located outside of the chamber.

14. The apparatus of claim 13 wherein said closure is welded to said container around the opening to seal the chamber.

15. The apparatus of claim 11 wherein said member is located in a retention chamber in said container, said retention chamber being located adjacent to the opening in said container and being frustoconical in shape.

* * * * *